(12) United States Patent
Momeni et al.

(10) Patent No.: US 10,583,491 B2
(45) Date of Patent: Mar. 10, 2020

(54) TOOL

(71) Applicant: Hilti Aktiengesellschaft, Schaan (LI)

(72) Inventors: Siavash Momeni, Buchs (CH); Steven Moseley, Nenzing-Gurtis (AT); Arno Glaser, Schaan (LI); Robert Hellein, Hadersdorf/Kamp (AT); Christian Gierl-Mayer, Vienna (AT); Wolf-Dieter Schubert, Vienna (AT); Herbert Danninger, Vienna (AT); Andrea Müller-Grunz, Differange (LU); Ralph Useldinger, Kehlen (LU)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/474,795

(22) PCT Filed: Dec. 14, 2017

(86) PCT No.: PCT/EP2017/082822
§ 371 (c)(1),
(2) Date: Jun. 28, 2019

(87) PCT Pub. No.: WO2018/121997
PCT Pub. Date: Jul. 5, 2018

(65) Prior Publication Data
US 2019/0344352 A1 Nov. 14, 2019

(30) Foreign Application Priority Data

Jan. 2, 2017 (EP) .................................... 17150053

(51) Int. Cl.
| | |
|---|---|
| *B22F 7/08* | (2006.01) |
| *B28D 1/14* | (2006.01) |
| *B23B 51/02* | (2006.01) |
| *C22C 29/08* | (2006.01) |
| *B28D 1/12* | (2006.01) |
| *B22F 5/00* | (2006.01) |

(52) U.S. Cl.
CPC ................ *B22F 7/08* (2013.01); *B23B 51/02* (2013.01); *B28D 1/146* (2013.01); *C22C 29/08* (2013.01); *B22F 2005/001* (2013.01); *B23B 2222/28* (2013.01); *B23B 2251/02* (2013.01); *B28D 1/121* (2013.01)

(58) Field of Classification Search
CPC ........... B22F 7/08; C22C 19/03; C22C 19/07; B28D 1/146; B23B 51/02
See application file for complete search history.

(56) References Cited

U.S. PATENT DOCUMENTS

| | | |
|---|---|---|
| 5,776,593 A | 7/1998 | Massa et al. |
| 6,511,265 B1 | 1/2003 | Mirchandani et al. |
| 2010/0003093 A1 | 1/2010 | Miyanaga |

FOREIGN PATENT DOCUMENTS

| | | |
|---|---|---|
| GB | 2 425 080 | 10/2006 |
| WO | 01/43899 | 6/2001 |

OTHER PUBLICATIONS

International Search Report dated Apr. 5, 2018 in PCT/EP2017/082822 with English translation.
Written Opinion dated Apr. 5, 2018 in PCT/EP2017/082822 with English translation.

*Primary Examiner* — Jessee R Roe
(74) *Attorney, Agent, or Firm* — Grüneberg and Myers PLLC

(57) ABSTRACT

A tool for machining materials has a main part and one or more blades. The main part is made of a low-alloy steel. The socket is welded to the main part, and the blade edges are made of a hard metal. The hard metal contains at least 82 vol. % of tungsten carbide and a metallic binder made of a cobalt-nickel-based alloy. The hardness of the hard metal is greater than 1350 HV10. The socket has a sintered composite, and 40 vol. % to 60 vol. % of the composite is composed of a metal carbide and a metallic binder. At least 95 vol. % of the metallic binder is made of nickel, and the hardness of the composite is less than 800 HV10.

13 Claims, 4 Drawing Sheets

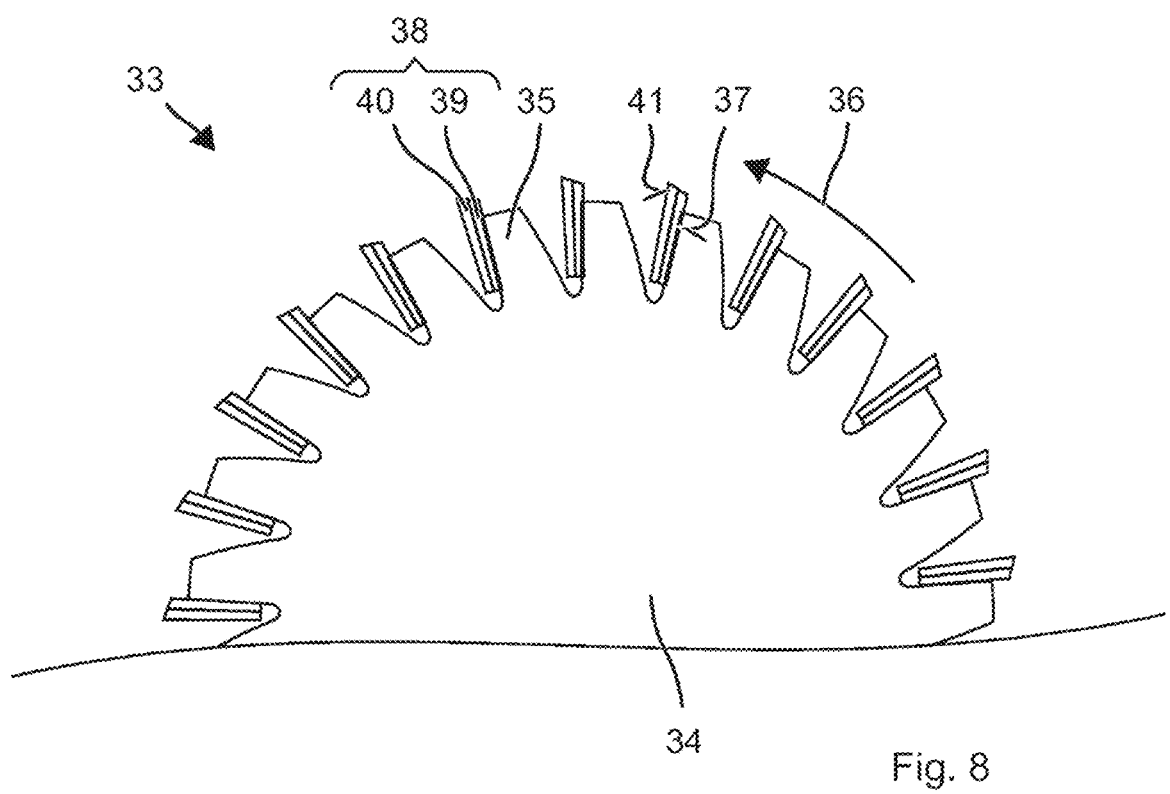

TOOL

This application is a National Stage entry under § 371 of international Application No. PCT/EP2017/082822, filed on Dec. 14, 2017, and which claims the benefit of European Application No. 17150053.1, filed on Jan. 2, 2017.

FIELD OF THE INVENTION

The present invention relates to a tool for mechanical machining of materials, especially chisel-edged drill bits having a sintered hard-metal head and rotating saw blades having welded-on cutters of sintered hard metal. The tool is suitable in particular for machining of steel-reinforced mineral construction materials.

Cutters of sintered hard metal have very high hardness, which is necessary for machining of abrasive and hard mineral construction materials. However, the cutters can be joined only with difficulty to a steel carrier. For example, the carriers are equipped with recesses for receiving the cutters interlockingly.

US 2010/0003093 describes a drill bit having a drilling head of sintered hard metal. An illustrative example describes a composition having a hard metal comprising tungsten carbide and a binder comprising cobalt and nickel. The tip consists only of tungsten carbide and cobalt in a weight ratio of 85:15, The nickel proportion is increased stepwise from zero at the tip to 8 wt % of the total material composition, with corresponding decrease of the proportion of tungsten carbide and cobalt. The ratio by mass of tungsten carbide and cobalt is constant over the entire height of the drilling head. The drilling head has a hardness of 90.3 HRa (approx. 1400 HV10) and at the base a hardness of 87.7 HRa (approx. 1100 HV10). As explained on the basis of a phase diagram, the invariable mass ratio proves to be advantageous for the manufacture of a drilling head that is hard at the tip and a drilling head that is softer at the base. The softer base is intended to facilitate bonding to the steel shank. The base is still very hard compared with conventional steels, Direct bonding by welding leads to high stresses.

DISCLOSURE OF THE INVENTION

The inventive tool for mechanical machining of materials has a main body and one or more cutters. The main body is made from a low-alloy steel. Low-alloy steels have additions of at most 5 wt % for refining, the most common additives being nickel, chromium, molybdenum, manganese, silicon and tungsten. The cutters have at least one cutting edge and a base. The base is welded onto the main body. The cutting edge consists of a hard metal. The hard metal contains at least 82 vol % of tungsten carbide and a metallic binder comprising a cobalt-nickel-base alloy. The hardness of the hard metal is greater than 1300 HV10. The base consists of a sintered composite. The composite is composed of 40 vol % (54 wt %) to 60 vol % (72 wt %) of metal carbide and of a metallic binder. The binder has a proportion of 55 vol % to 40 vol %. The metallic binder consists of at least 95 vol % of nickel. The hardness of the composite is lower than 800 HV10. Preferably, the metal carbide of the composite may be formed predominantly by tungsten carbide, more preferably of tungsten carbide. Preferably, the hardness of the hard metal may be smaller than 1600 HV10.

The different composition of the binder in the working region and the base causes a reduction of migration of the metallic binder. This is advantageous for avoiding equalization of the hardness between the two regions. Furthermore, by virtue of the material selection, no different shrinkage behavior results even during sintering of the regions, which otherwise are mechanically very different. Hereby, not only are internal mechanical stresses avoided but also more complex geometries may be manufactured by the sintering method.

The Vickers hardness of the HV10 type is to be measured in accordance with the requirements of the DIN EN ISO 6507-1 standard of March 2006. In simplified form, the standard provides for the following measuring setup. A pyramidal indenter has an angle of 136 degrees at the tip. The indenter is pressed into the surface with a force of approximately 98 Newtons. The time of action ranges between 10 seconds and 30 seconds. The ratio of the test force to the area of the indentation is the hardness value.

BRIEF DESCRIPTION OF THE FIGURES

The following description explains the invention on the basis of exemplary embodiments and figures. In the figures,
FIG. 8 shows a saw blade
Like or functionally equivalent elements are indicated by like reference symbols in the figures, unless otherwise indicated.

EMBODIMENTS OF THE INVENTION

Figure 1:
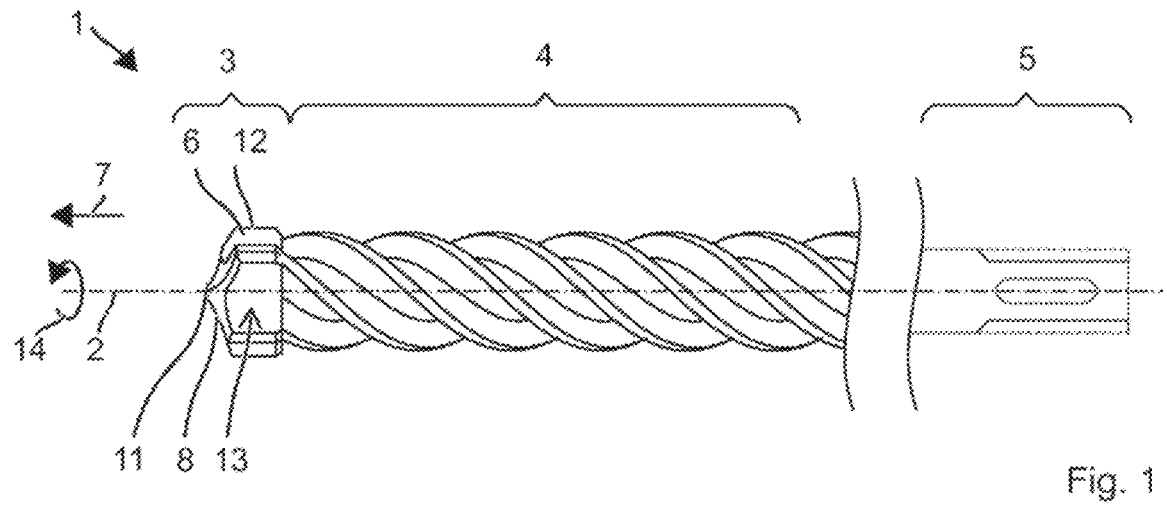
FIG. 1 shows a drill bit
Figure 2:
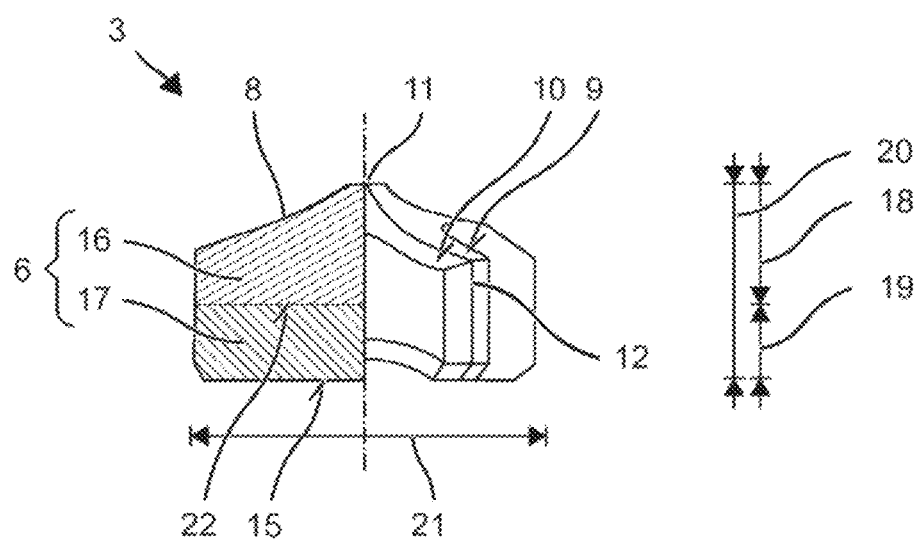
FIG. 2 shows a schematic diagram of a drilling head

FIG. 1 shows, in schematically simplified manner, an exemplary twist drill bit 1 for machining of rock or mineral construction materials. Twist drill bit 1 has, in succession along a drill-bit axis 2, a drilling head 3, a carrying main body 4, formed by what is, for example, a helical spiral, and an insertion end 5. FIG. 2 shows drilling head 3 in an enlarged partial section.

The illustrated twist drill bit 1 is designed for machining of reinforced rock, especially for chiseling activity superposed on the rotary movement. Drilling head 3 has three to six, for example four, monolithically cohesive cutters 6. Cutters 6 respectively have a cutting edge 8 pointing in twist direction 7. Cutting edges 8 are respectively formed as a line of intersection of a face 9 leading in the direction of rotation of drill bit 1 and a trailing face 10, both of which point in twist direction 7 and are inclined by at least 60 degrees relative to drill-bit axis 2. Cutters 8 are designed in a shape for shattering the rock and if necessary for shaving off reinforcement. Cutting edges 8 extend substantially in radial direction, e.g. starting from a tip 11 of drilling head 3 to a rim of drilling head 3, where cutting edges 8 are preferably set back in twist direction 7 relative to tip 11. An inclination of cutting edges 8 relative to axis 2 may be constant in radial direction or, in the region of tip 11, may be smaller than at the rim. In particular, at the rim, cutting edge 8 may extend perpendicular to drill-bit axis 2. At cutting edges 8 pointing in twist angle 7, a break-off edge 12, which extends parallel to axis 2, is adjoined to the rim of drilling head 3. Break-off edge 12 preferably extends radially beyond the spiral. At its circumference, drilling head 3 is equipped with flutes 13, which extend parallel to drill-bit axis 2 and along which drilling dust may be transported out of the drilled hole.

Flutes 13 are disposed in circumferential direction 14 between cutting edges 8. The illustrated drilling head 3 has two pairs of differently formed cutting edges, of which the cutting edges forming tip 11 are known as the main cutting edges and the other pair is known as the secondary cutting edges. Instead of four, drilling head 3 may also have two cutting edges, for example only the main cutters, or three or more than four cutting edges. Drilling head 3 has an underside 15, which is turned away from tip 11 and, for example, is planar. In one embodiment, underside 15 may be convex toward tip 11. Drilling head 3 is welded with underside 15 onto spiral 4.

Drilling head 3 with the four cutters 6, for example, is a cohesively sintered body comprising two different materials. Drilling head 3 is subdivided along axis 2 into an upper (working) region 16 that includes cutting edges 8 and a lower base 17 together with underside 15, which differ in their material composition. Working region 16 and base 17 are in contact with one another and are joined to one another by material-to-material bonding via a sintering process. Working region 16 comprises a sintered hard metal, Base 17 comprises a sintered composite. Height 18 of working region 16 ranges, for example, between 2 mm and 5 mm. Height 19 of base 17 lies preferably in the range between 10% and 50% of total height 20 of drilling head 3. Diameter 21 of base 17 is preferably somewhat smaller than the diameter in working region 16. Underside 15 is formed by a base 17. Base 17, illustrated by way of example, has a plane surface 22, or, if the underside of drilling head 3 is convex, the upper side of base 17 is convex in the same way.

Cutting edges 8 comprise a sintered hard metal, which consists of tungsten carbide and a metallic binder. Other materials may be contained in traces totaling less than 2 vol %, for example as impurities. The tungsten carbide is the main ingredient of the hard metal, and it has a proportion by volume of at least 82%. Only the high tungsten carbide content achieves the hardness necessary for cutting edges 8. Furthermore, other carbides prove to be unsuitable for cutting edges 8, The tungsten carbide is present as medium-grained material, wherein the WC grains have a mean size in the range of 1.3 μm to 2.5 μm and are embedded in the metallic binder material. The metallic binder is a cobalt-base alloy, which has a cobalt proportion of at least 40 vol %, e.g. more than 80 vol %. Or the metallic binder is preferably a cobalt-nickel-base alloy, which contains cobalt and nickel as the main ingredients. Cobalt and nickel together have a proportion of at least 80 vol %, preferably at least 85 vol % in the binder. Besides cobalt, nickel and dissolved tungsten and carbon from the tungsten carbide, the binder may also contain molybdenum and/or chromium. Both nickel and cobalt respectively have at least a proportion of 20 vol % in the binder, i.e. the stoichiometric ratio of nickel to cobalt lies preferably in the range between 2:3 and 3:2.

Base 17 is formed from a sintered composite of tungsten carbide and a metallic binder. The tungsten carbide is present as embedded grains. The proportion by volume of tungsten carbide in the composite is higher than 40 vol %, e.g. preferably greater than 45 vol %, especially greater than 50 vol %, and lower than 60 vol %. The metallic binder of the composite contains substantially only nickel. The binder preferably has only a small proportion of impurities, e.g. less than 5 vol %, The binder has a proportion of more than 40 vol % and less than 60 vol % in the composite. The hardness of the composite is smaller than 800 HV10. The hardness is derived mainly from the proportion of the metallic binder. To a lesser degree, the hardness may also be changed by the size of the grains.

Drilling head 3 comprising cutting edges 8 and base 17 is manufactured in a common sintering process. Joint zone 22 between cutting edges 8 and base 17 is formed in characteristic manner by the sintering process. A mold for drilling head 3 is filled with a powder mixture of starting materials for base 17. The mixture contains grains of tungsten carbide, nickel powder and an organic binder. A punch presses the mixture in the mold. In a next step, a second powder mixture of the starting materials for the hard metal of working region 16, i.e. grains of tungsten carbide, cobalt and nickel powders and an organic binder are filled into the mold onto the first mixture. The mixture is pressed. The organic binder is removed by heat treatment. The resulting brown compact is sintered at a temperature between 1300 degrees and 1450 degrees. The metallic binders wet the tungsten carbide. Although multi-stage filling and pressing in which the powder mixture for base 17 is filled in first was described in the foregoing, it is also possible, for example, to choose the inverse procedure and to fill in the powder mixture for working region 16 first and to press it, or to perform a one-stage pressing process, in which the powder mixtures for both regions are introduced into the mold in layers one above the other and are then pressed at the same time. Drilling head 3 together with bottom face 15 is welded onto main body 4. Main body 4 comprises a low-alloy toughening steel. Additives for refining the steel have a proportion of less than 5 wt %. Bottom face 15 of base 17 is placed in precisely fitting manner on an end face of main body 4. The two boundary faces are preferably plane, or alternatively are curved in the same way. Welding takes place at a temperature of approximately 1200 degrees Celsius, preferably by resistance welding. Typically, no metals or metal mixtures having melting temperature below the melting temperature of the steel are introduced into the weld zone for the purpose of welding. Welding may be assisted by feeding a welding wire or a nickel foil.

Examples 1 and Comparison Example

Figure 3:
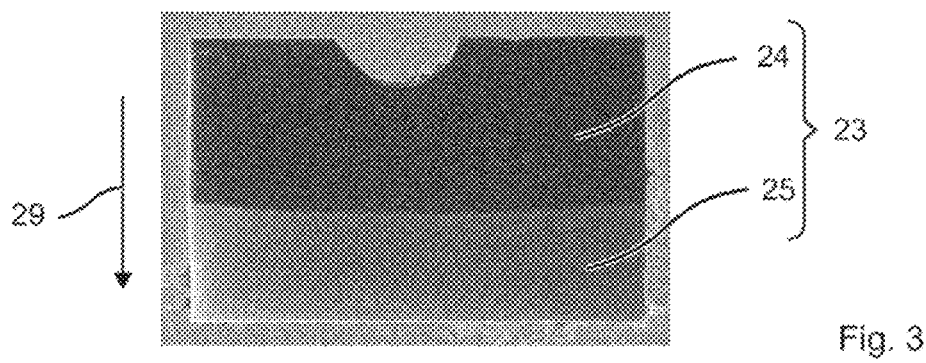
FIG. 3 shows a micrograph of a cutter

A first geometrically simplified cutter 23 having a working region 24 comprising a hard metal and a base 25 comprising a sintered composite is shown in FIG. 3. The hard phase of the hard metal comprises tungsten carbide. The hard phase has a proportion of 90.0 vol % (94 wt %) in working region 24. The binder is a cobalt-nickel-base alloy containing an addition of molybdenum. Cobalt and nickel have equal proportions by volume. The hard phase of the composite in base 25 likewise comprises tungsten carbide, but has only 57 vol % (70 wt %) in the composite. The metallic binder in base 25 is pure nickel. The proportion of nickel in base 25 is 43 vol % (30 wt %).

Figure 4:
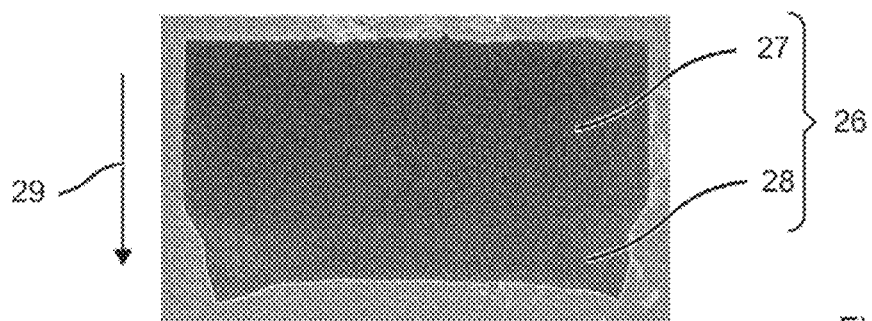
FIG. 4 shows a micrograph of a cutter

A second geometrically simplified cutter 26 having a working region 27 and a base 28 is shown in FIG. 4. Second cutter 26 differs from first cutter 23 only in the composition of the binder in base 28. The binder contains cobalt and nickel in equal proportions. Otherwise the two cutters 23, 26 are identical.

The hard phase of the hard metal of working region 27 comprises tungsten carbide. The hard phase has a proportion of 90.0 vol % (94 wt %) in working region 27. The binder is a cobalt-nickel-base alloy containing an addition of molybdenum. The hard phase of the composite in base 28 likewise comprises tungsten carbide and contributes 57 vol % (70 wt %) in the composite.

The brown compacts of cutters 23, 26 both have the same cylindrical shape and the same geometric dimensions prior to sintering. Obviously undesired deformation of base 28 compared with working region 27 takes place in second cutter 26. During sintering, the material compositions become compacted and consequently cutters 23, 26 shrink. In the case of simple geometries, the shrinkage behavior during sintering may be compensated by correspondingly larger brown compacts. Nevertheless, it is disadvantageous that the significantly different proportions of tungsten carbide likewise lead to different shrinkage behavior. In second cutter 26, the dimensions of base 25 decrease significantly more than those of working region 24. The different shrinkage behavior not only can be attributed to the different material compositions alone, but it also results from effective diffusion of metallic binder from the binder-rich base 28 into the binder-poorer working region 27, In first cutter 23, it was possible to compensate for or suppress the different shrinkage behavior and the diffusion by the different composition of the binder, as can be seen in FIG. 3. There, the binder of working region 24 contains a substantial proportion of cobalt, whereas the binder of base 25 is substantially free of cobalt.

FIG. 3 shows a microsection through the sintered body. The boundary region between the hard metal and the composite does not exhibit any cracks despite a large discontinuity in hardness. By virtue of the very hard working region 24 of approximately 1600 HV10, first cutter 23 is suitable both for machining of mineral material. In addition, base 25 of steel may be welded onto it, for which purpose the low hardness of approximately 600 HV10 is advantageous. The hardness of base 25 corresponds largely to the hardness of steel. The transition region between hard working region 24 and soft base 25 is sharply defined, which is explained by slight diffusion of the binder during sintering. Despite the sharp transition, the transition region is mechanically stable. Second cutter 26 proves to be less suitable. A microsection through second cutter 26 is shown in FIG. 4. The suspected diffusion significantly softens working region 16. A hardness of less than 1300 HV10 is considered to be unsuitable for machining of rock. In addition, the harder base 28 may be welded only laboriously onto the shank.

Figure 5:
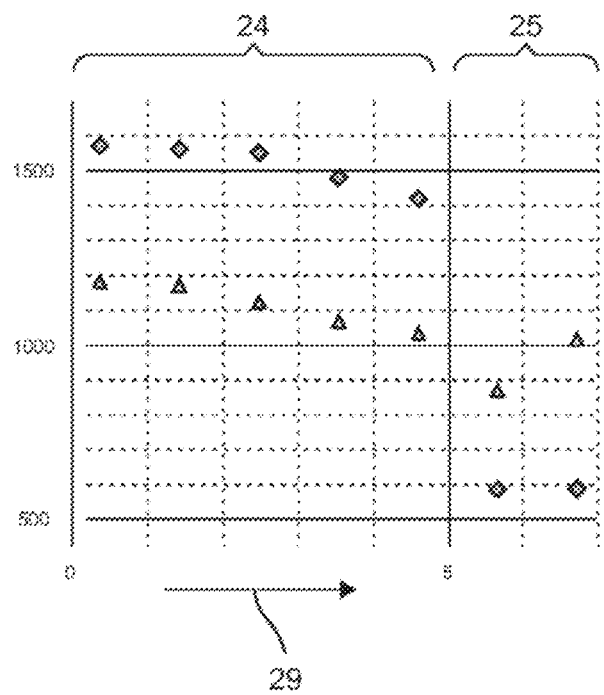
FIG. 5 shows a hardness profile

FIG. 5 shows the hardness profile for the two cutters 23, 26. The hardnesses of cutters 23, 26 are determined at intervals of approximately 1 mm along height 29. The measurement points for first cutter 23 are plotted as diamonds and the measurement points for second cutter 26 as triangles. First cutter 23 has a significantly different hardness in working region 24 compared with base 25. The hardness is substantially constant over the entire height of working region 24, or remains at least above 1300 HV10, especially above 1350 HV10. Over its entire height, base 25 has a low hardness of well under 800 HV10, for example equal to or below 600 HV10. Equalization of the hardnesses between working region 24 and base 25 probably does not occur during cosintering for this cutter 23. The hardness has a sharp discontinuity in the transition region from working region 24 to base 25. The discontinuity increases by 500 HV10 within one millimeter; the example has a discontinuity of 800 HV10 within one millimeter. In stark contrast to this, the hardness in the second cutter has been equalized between the cutter and the working region. Although the working regions of the two cutters 23, 26 consist of the same starting materials, the working region in the second cutter is more than 300 HV10 softer and no longer suitable for a drilling head 3. The base of the second cutter is indeed always still softer than working region 16, but is already so hard that welding to common grades of steel is associated with great difficulty.

The manufacturing method used for the two cutters 23, 26 is as follows. The hard-metal powder of the working region consists of 90.0 vol % of tungsten carbide powder having a mean particle size of 5 μm and of 10.0 vol % of starting powder for the cobalt-nickel-base binder. The starting powder for the cobalt-nickel-base binder in turn consists of a mixture of 46 vol % cobalt-powder, 46 vol % nickel powder and 8 vol % molybdenum carbide. Along with addition of an organic binder, a first granulate is produced from this hard-metal powder mixture by grinding in an attritor and spraying.

The starting material for the composite of base 25 of the first cutter consists of 57 vol % of tungsten carbide powder. The mean particle size lies in the range of 5 μm. The remaining proportion of 43 vol % (30 wt %) is formed by nickel powder. The nickel is supplied as powder having a purity of 99.5%. Along with addition of an organic binder, a second granulate for first cutter 23 is produced from this mixture of particulate metal-matrix powder by grinding in the attritor and spraying.

The starting material for the composite of base 28 of the second cutter has a 57 vol % content of tungsten carbide powder. The mean particle size lies in the range of 5 μm. The remaining proportion of 43 vol % is starting powder for the metallic binder. The binder is supplied from powder having nickel and cobalt in equal parts by volume. Impurities of the powder are less than 1%. A mean particle size lies at 2.5 p. Along with addition of an organic binder, a second granulate for second cutter 26 is produced from this mixture of particulate metal-matrix powder by grinding in the attritor and spraying.

The first granulate and the second granulate of the respective cutters 23, 26 are filled successively into a cylindrical press mold, which corresponds approximately to the dimensions of a drilling head 3 illustrated in FIG. 2. Then the granulates are pressed at the same time in one process step. The green compact produced in this way is sintered densely in a sintering furnace under vacuum at a temperature of 1400° C. Cooling then takes place in the sintering furnace.

Example 3

Figure 6:
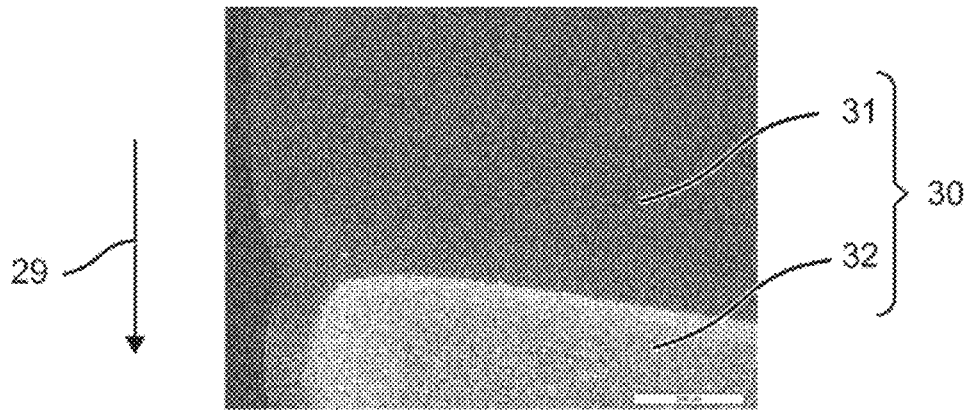
FIG. 6 shows a micrograph of a cutter

A further example of a cutter 30 is shown in part in FIG. 6. Working region 31 consists of 87.3 vol % (92.5 wt %) of tungsten carbide and a metallic binder consisting of a cobalt-nickel-base alloy containing an addition of molybdenum. Cobalt and nickel have equal proportions by volume. Base 32 has a hard phase of tungsten carbide. The proportion by volume of the hard phase amounts to 57 vol % (70 wt %) of the composite. The metallic binder in base 32 is pure nickel.

The manufacturing method is analogous to the method described in the foregoing. The hard-metal powder for working region 31 consists of 87.3 vol % (92.5 wt %) of tungsten carbide powder having a mean particle size of 5 μm and 12.7 vol % of starting powder for the cobalt-nickel-base binder. This cobalt-nickel-base binder in turn consists of a mixture of 46 vol % cobalt-powder, 46 vol % nickel powder and 8 vol % molybdenum carbide. Along with addition of an organic binder, a first granulate is produced from this hard-metal powder mixture by grinding in an attritor and spraying. The starting powder for the composite of base 17 consists of 57 vol % of WC powder. The mean particle size lies in the range of 5 μm. The remaining proportion of 43 vol % comprises nickel. The nickel is supplied as powder having a purity of 99.5%. Along with addition of an organic binder, a second granulate is produced from this mixture of particulate metal-matrix powder by grinding in the attritor and spraying. The granulates are pressed and sintered at 1420° C.

Figure 7:
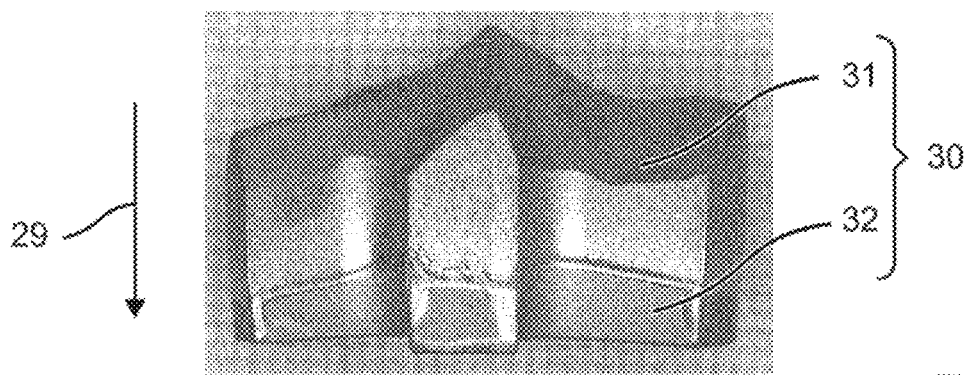
FIG. 7 shows a drilling head

FIG. 6 shows a microsection through sintered cutter 30. The boundary region between the hard metal and the composite does not exhibit any cracks despite a large discontinuity in hardness. Working region 31 has a hardness of 1433 HV10, and base 32 a hardness of 712 HV10. Working region 31 and base 32 exhibit approximately the same shrinkage behavior during the sintering process. The length dimensions of working region 31 decrease by 20% and the length dimensions of base 32 decrease by 20%. The same shrinkage behavior is obtained by slight migration of the binder from working region 31 into base 32 and vice versa. FIG. 7 shows a drilling head 3 having the same material composition and sintering method as the example of FIG. 6.

Further Examples

The working region of the drilling head having different proportions of binders was investigated. The hard phase of tungsten carbide is reduced to 85 vol % (91 wt %) compared with Example 1, The binder has the same composition as in Example 1. The base has the same composition as in Example 1. As expected, the hardness of the working region is decreased due to the higher binder content. The working region has a hardness of 1330 HV10, and the base a hardness of 550 HV10. The transition region, in which the hardness increases, has a height of less than 1 mm, analogous to FIG. 5. A further drilling head has a proportion of 88 vol % (98 wt %) of hard phase in the working region and is otherwise composed as in Example 1. The hardness of the working range lies at 1400 HV10 and the hardness of base 32 at 550 HV10. The transition region, in which the hardness increases, has a height of less than 1 mm, analogous to FIG. 5, The hardness of the drilling head can be adjusted in the preferred hardness range via the binder proportion. The proportion of cobalt compared with nickel was increased, and in this case also, no influence on the behavior during cosintering was found.

A further example has a different composition of the binder in the working region. The binder comprises pure cobalt, possibly containing impurities. The proportion of the binder in the working region is 43 vol % (30 wt %). The hard phase comprises tungsten carbide. The base is as in Example 1, After cosintering, the working region has a hardness of 1340 HV10, and base 39 a hardness of 571 HV10.

Because of the higher binder proportion in the base, a tendency toward better properties during welding can be expected. A drilling head in the composition of FIG. 1, but having a binder proportion of 45 vol % (32 wt %), i.e. of pure nickel, in the base was investigated. The investigated drilling head has a hardness of 1379 HV10 in the working region and a hardness of 618 HV in the base, Compared with Example 1, the hardness of the working range has decreased somewhat, but is still of interest for a drilling head. In turn, an addition of Al2O3 of approximately 1 wt % to the starting materials of the base increased the hardness to 1403 HV10. A drilling head having an even higher binder content of 50 vol % exhibited qualitatively good properties. Adequate hardness can be expected due to an admixture of Al2O3.

In further examples, the hard phase of the base comprising tungsten carbide is partly substituted by titanium carbide or niobium carbide. The composition of the hard phase consists of 90% of tungsten carbide and 10% of the other carbides. The binder is pure nickel having a proportion by volume of 43 vol % (30 wt %), as in Example 1. In the conducted experiments, a significant equalization of the hardness in the working region and in the base was found. For example, at a 10% proportion of niobium carbide, the hardness is 1220 HV10 in the working region and 1220 HV10 in the base.

FIG. 8 shows a detail of an exemplary disk-shaped saw blade 33. Saw blade 33 has a disk-shaped main body 34. Main body 34 comprises a low-alloy steel. The disk has several tooth recesses 35, which are disposed along the circumference of the disk. Tooth recesses 35 respectively have facets 37 pointing in the direction of rotation 36 of saw blade 33. A wear-resistant cutter 38 is welded onto facets 37. Blade 38 is sintered from two materials. Base 39 of cutter 38 consists of the composite described in the foregoing. The composite has a matrix comprising a metallic binder, which consists of at least 95 vol % of nickel. Particles of tungsten carbide, molybdenum carbide, niobium carbide, chromium carbide or a mixture of these carbides are embedded in the matrix. The particles have a proportion of 40 vol % to 60 vol % in the composite. Working portion 40 of cutter 38, having cutting edge 41 and pointing in the direction of rotation, comprises hard metal. The hard metal has a very high proportion of tungsten carbide and a metallic binder comprising a cobalt-nickel-base alloy or cobalt-base alloy.

The invention claimed is:

1. A tool for mechanical machining of materials, said tool comprising:
    a main body comprising a low-alloy steel, and
    one or more sintered cutters, which have at least one cutting edge and a base, wherein the base is welded onto the main body,
    wherein the cutting edge consists of a hard metal, which contains at least 82 vol % of tungsten carbide, and a first metallic binder comprising a cobalt-nickel-base alloy or a cobalt-base alloy, wherein the hardness of the hard metal is greater than 1300 HV10, and
    wherein the base consists of a composite which comprises 40 vol % to 60 vol % of metal carbide, and a second metallic binder, wherein the second metallic binder consists of at least 95 vol % of nickel, and wherein the hardness of the composite is smaller than 800 HV10.

2. The tool according to claim 1, wherein the hardness of the composite is greater than 500 HV10.

3. The tool according to claim 1, wherein the hardness of the hard metal is smaller than 1600 HV10.

4. The tool according to claim 1, wherein cobalt and nickel together contribute at least 80 vol % of the cobalt-nickel-base alloy of the hard metal.

5. The tool according to claim 4, wherein the cobalt-nickel-base alloy of the hard metal contains at least 40 vol % nickel.

6. The tool according to claim 1, wherein the cobalt-nickel-base alloy of the hard metal contains at least 80 vol % cobalt.

7. The tool according to claim 1, wherein the cutting edge adjoins the base.

8. The tool according to claim 1, wherein the base having a base face is welded onto the main body and the height of the base corresponds to between 10% and 50% of the total height of the sintered cutter.

9. The tool according to claim 1, wherein the metal carbide of the base is at least 95 vol % tungsten carbide.

10. The tool according to claim 1, wherein the tool is a drill bit, which has a drilling head having three to six cohesively sintered cutters.

11. The tool according to claim 10, wherein the cutting edge is respectively formed from a leading face that is leading in the direction of rotation of the drill bit and a trailing face that is trailing in the direction of rotation of the drill bit and the leading face and the trailing face include an obtuse angle.

12. The tool according to claim 1, wherein the metal carbide of the base is at least 98% tungsten carbide.

13. The tool according to claim 1, wherein the metal carbide of the base completely consists of tungsten carbide.

\* \* \* \* \*